United States Patent [19]

Nohira et al.

[11] 3,895,541

[45] July 22, 1975

[54] CONTROL SYSTEM FOR MOTOR VEHICLE WITH CATALYTIC CONVERTOR AND AUTOMATIC POWER TRANSMISSION MECHANISM

[75] Inventors: Hidetaka Nohira, Susono; Shin Ito, Nagoya, both of Japan

[73] Assignee: Toyota Jidosha Kogyo Kabushiki Kaisha, Japan

[22] Filed: June 15, 1973

[21] Appl. No.: 370,207

[30] Foreign Application Priority Data

June 26, 1972 Japan.............................. 47-63190

[52] U.S. Cl.................... 74/844; 74/752 C; 74/866
[51] Int. Cl....................... B60k 23/00; F16h 3/74
[58] Field of Search.......... 74/844, 856, 866, 752 C; 251/30; 137/625.34

[56] References Cited
UNITED STATES PATENTS

| | | | |
|---|---|---|---|
| 2,230,777 | 2/1941 | Hey | 74/844 X |
| 2,353,840 | 7/1944 | McKechnie | 74/844 |
| 2,761,470 | 9/1956 | Batts | 251/30 X |
| 2,981,122 | 4/1961 | Kelley | 74/752 C X |
| 3,640,156 | 2/1972 | Mori et al. | 74/844 X |
| 3,713,351 | 1/1973 | Sakakibara et al. | 74/866 X |
| 3,748,929 | 7/1973 | Green | 74/844 |
| 3,808,829 | 5/1974 | Peruglia | 251/30 X |

*Primary Examiner*—Samuel Scott
*Assistant Examiner*—P. S. Lall
*Attorney, Agent, or Firm*—Toren, McGeady and Stanger

[57] ABSTRACT

A control system is provided for a motor vehicle including a catalytic convertor for purifying engine exhaust gases and an automatic power transmission mechanism controlled by an oil pressure system. The control system of the invention operates in conjunction with the oil pressure control system of the automatic transmission to sense engine exhaust gas temperature and to delay upshift of the automatic transmission until a desired temperature of the engine exhaust gases is achieved.

7 Claims, 10 Drawing Figures

CONTROL SYSTEM FOR MOTOR VEHICLE WITH CATALYTIC CONVERTOR AND AUTOMATIC POWER TRANSMISSION MECHANISM

BACKGROUND OF THE INVENTION

1. Field of the Invention

The present invention relates to control systems for motor vehicles provided with a catalytic converter for purifying engine exhaust gases and with an automatic power transmission mechanism for automatically providing a plurality of forward driving speed ratios. More particularly, the inventor relates to an improved motor vehicle control system of the above type, in which upshift to a higher driving speed ratio is controlled in order to rapidly elevate the temperature of the engine exhaust gases thereby to improve activity and operation of the catalytic convertor.

2. Description of the Prior Art

Heretofore, a variety of systems have been proposed to reduce or eliminate noxious contents in engine exhaust gases, such as, nitrogen oxides, carbon monoxide and hydrocarbons. One of the most promising systems is considered to be the so-called catalytic convertor system, in which, as is well known, metal oxides such as manganese oxide and precious metals such as platinum are employed as an active catalyst for promoting oxidization of the unburned and partially burned contents of the exhaust gases and reduction of the nitrogen oxides. In order to afford sufficient activity, the catalyst and the engine exhaust gases are required to be maintained at a relatively high temperature level. This requirement becomes especially important just after the engine is started and particularly in regions having a cold climate. Because, during this warmup operation, the temperature of the engine exhaust gases is at a low level, the catalytic converter is unable to sufficiently purify the engine exhaust gases. Thus, purification of the engine exhaust gases during the several minutes after engine starting is a major problem for reducing the noxious contents in the engine exhaust gases. This problem can be solved by elevating the exhaust gas temperature as soon as possible after the engine has been started. Difficulty is, however, encountered in a motor vehicle provided with an automatic power transmission mechanism because shifting between its driving speed ratios is automatically controlled irrespective of the exhaust gas temperature, thus retarding temperature increase in the exhaust gases, as compared with a manually controlled power transmission mechanism in which the control of the engine speed is manually performed to promote temperature increase.

SUMMARY OF THE INVENTION

It is, therefore, an object of the present invention to eliminate the above-mentioned drawbacks concomitant with a motor vehicle with an automatic power transmission mechanism, in which engine exhaust gases are purified by a catalytic convertor.

According to a major feature of the present invention, therefore, in an oil pressure control system for an automatic power transmission mechanism, line pressure supply for effecting an upshift to a higher driving speed ratio is blocked and the change-over conditions for a shift valve of the control system are altered when the temperature of the engine exhaust gases is at a depressed or low level just after engine starting. As a result, the motor vehicle is induced to operate for a longer period at a lower driving speed ratio with its engine being driven at a higher speed, so that the exhaust gas temperature is rapidly elevated to a predetermined level at which the catalyst in the catalytic convertor is effectively operative.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENTS

Figure 1:
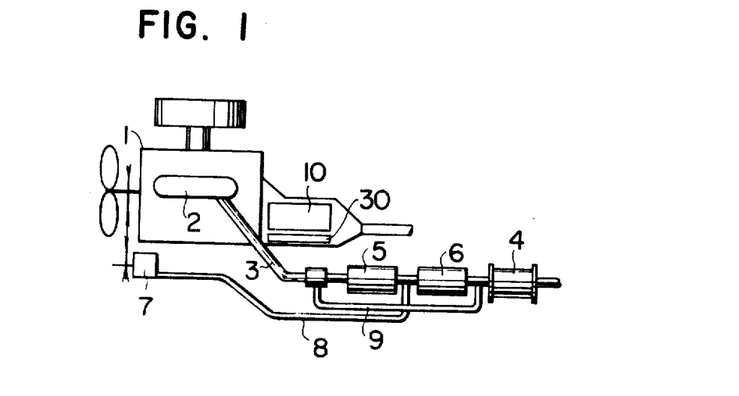
FIG. 1 is a diagramatical view showing essential parts of a motor vehicle to which the present invention is applied.

Referring now to the accompanying drawings, and particularly to FIG. 1, a motor vehicle provided with a catalytic convertor and with an automatic power transmission mechanism is shown. Midway of an exhaust pipe 3, leading from an exhaust manifold 2 of an engine 1, and upstream of a muffler 4, there are provided two serial catalytic convertors 5 and 6 which are respectively operable to reduce nitrogen oxides and to reduce hydrocarbons and carbon monoxide. In this exhaust system there are also provided a conduit 8, through which secondary air is supplied by means of an air pump 7 driven by the engine 1, and an exhaust bypass conduit 9 for preventing overheating of the catalysts in the convertors 5 and 6. In a power transmission system for transmitting output power of the engine 1, there are provided an automatic power transmission mechanism 10 and an oil pressure control system 30 for controlling the shifting operations of the transmission mechanism 10 in response to the relationship between the vehicle speed and the engine load.

Figure 2:
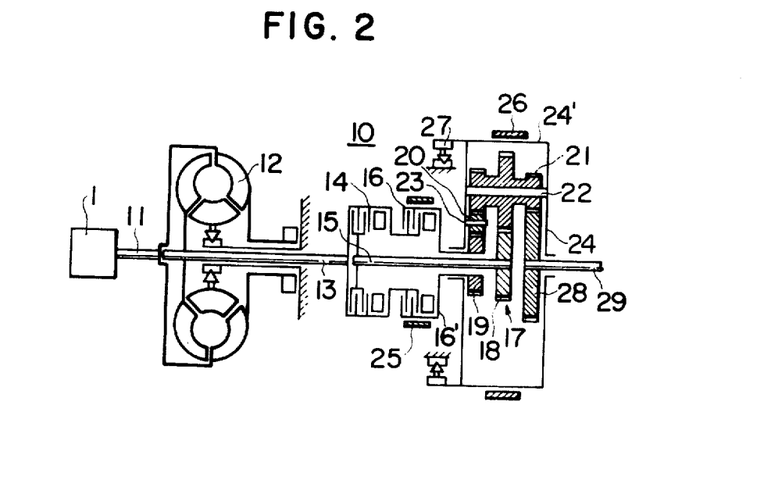
FIG. 2 is a diagramatical view showing a representative construction of an automatic power transmission mechanism to which the present invention is applied, said transmission providing three forward and one reverse driving speed ratios.

The transmission mechanism 10 may be of any type, but for illustrative purposes only the construction and operation thereof will be described with respect to an automatic power transmission mechanism of a known fluid coupling type having three forward and one reverse driving speed ratios, as shown in FIG. 2. A crankshaft 11 leading from the engine 1 is connected through a torque converter 12 with a turbine shaft 13, which in turn is connected through a front clutch 14, an intermediate shaft 15 and a rear clutch 16 with a planetary gear mechanism 17. This planetary gear mechanism 17 includes an input sun gear 18 formed integral with the intermediate shaft 15, a reverse sun gear 19 formed integral with a clutch drum 16' of the rear clutch 16, a pinion 21 directly meshing with the input sun gear 18 and meshing with the reverse sun gear 19 through an idler gear 20, and a carrier 24 carrying pins 22 and 23 which respectively rotatably bear the idler gear 20 and the pinion 21. In the transmission mechanism 10, there are provided a front brake band 25, which is disposed around the rear clutch drum 16', and a rear brake band 26 which is disposed around a drum 24' of the carrier 24. A one-way clutch 27 is also provided in connection with the carrier drum 24'. Thus, engine output power is extracted from an output shaft 29 which is connected through a gear 28 with the pinion 21.

With these construction arrangements, engine output power is transmitted from the engine 1 to the turbine shaft 13 through the torque converter 12 and is then transmitted to the planetary gear mechanism 17 by selectively or simultaneously bringing the two paired clutches 14 and 16 into frictional engagement. Then, the direction of rotation of the carrier 24 is determined by the action of the one-way clutch 27. The subsequent selective application of the two paired brake bands 25 and 26 will stop the rotation of either the reverse sun gear 19 or the carrier 24, thus providing three forward driving speed ratios and one reversed backward driving speed ratio at the output shaft 29. More specifically, a first speed ratio is obtained when the engine output power is transmitted by the actions of the front clutch 14 and of the one-way clutch 27 from the intermediate shaft 15 through the input sun gear 18 to the pinion 21. Another first speed ratio is also obtained for applying a braking force to the engine 1, when a driven force from the motor vehicle is transmitted by the action of the rear brake band 26 through the output shaft 29 to restrain the rotation of the carrier 24. On the other hand, a second speed ratio is obtainable when the pinion 21 performs a planetary revolution with the front clutch 14 and the front brake band 25 being applied. When, however, the rear clutch 16 is brought into action in place of the front brake band 25, then the planetary gear system as a whole rotates in the same direction as that of the turbine shaft 13, thus producing a third speed ratio. A reversed backward speed ratio is obtained when the idler gear 20 is brought into action by an input power which is applied to the reverse sun gear 19 by the actions of the rear clutch 16 and of the rear brake band 26.

Figure 3:
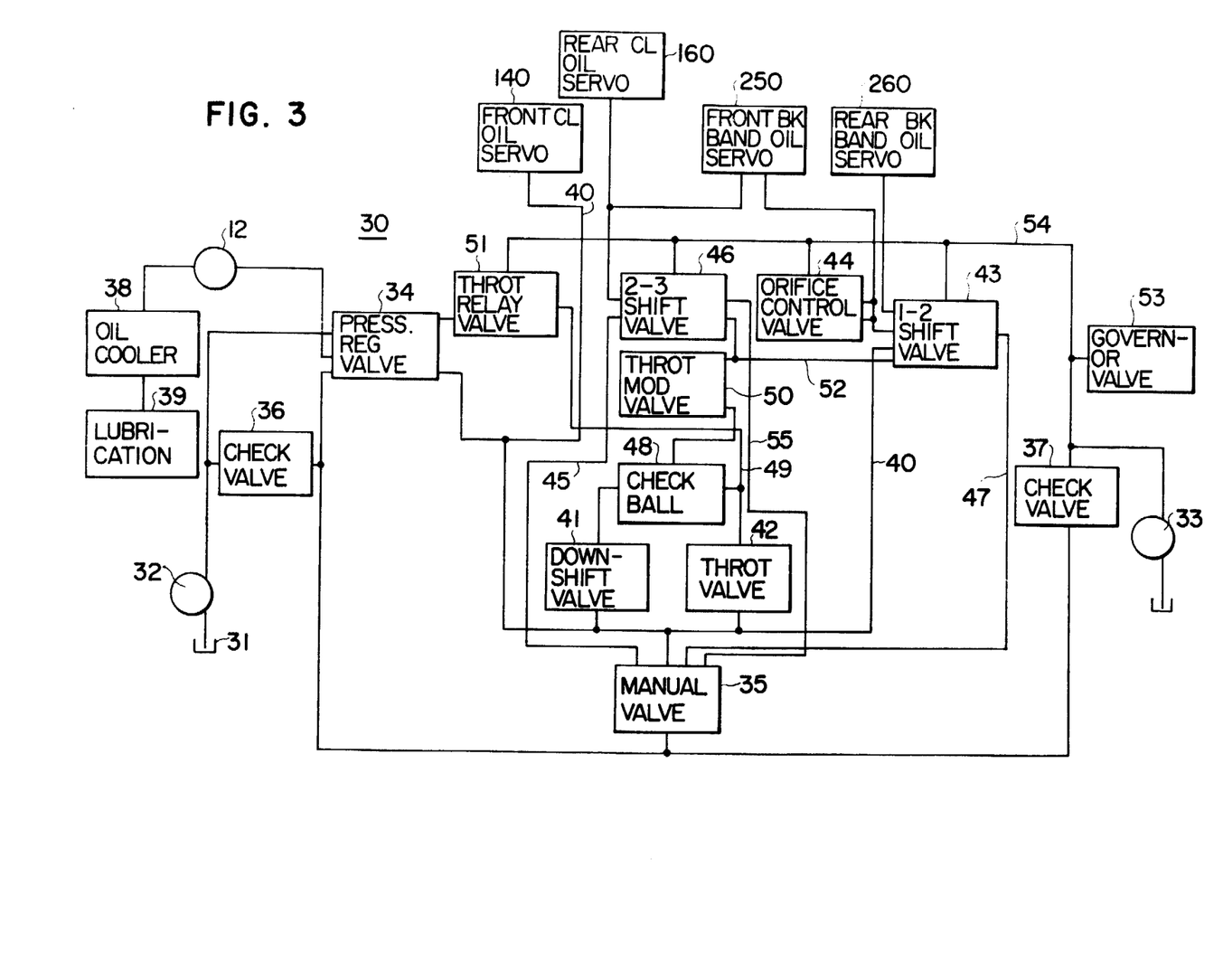
FIG. 3 is a flow chart showing an oil pressure control system for controlling the operation of the automatic power transmission mechanism of FIG. 2.

Turning now to FIG. 3, there is shown a known oil pressure control system 30 which is used with the automatic power transmission mechanism 10 for applying and releasing the paired clutches 14 and 16 and the paired brake bands 25 and 26. As shown, oil from an oil pan 31 is supplied to a pressure regulator valve 34 by the actions of a front oil pump 32, which is driven by the crankshaft 11, and of a rear oil pump 33 which is driven by the output shaft 29. Line pressure supplied from this valve 34 to a manual valve 35 is regulated during the forward driving operations in response to the throttle opening and to the vehicle speed, and is boosted during the backward driving operation at a constant high level irrespective of such running conditions. In the oil circuit of the control system 30 there are provided oil check valves 36 and 37 which are operative to select the operations of the front and rear oil pumps 32 and 33 such that the former pump 32 is actuated during low speed and backward driving operations while the main actuation is shifted from the former to the latter pump 33 during a higher speed driving operation. The line pressure thus produced at the pressure regulator valve 34 is also introduced to the torque converter 12, an oil cooler 38 and a lubricator 39. The discharge side of the manual valve 35 is communicated by way of an oil passage with a downshift plug 41, a throttle valve 42 and an oil servo 140 for the front clutch, and with the inlet side of an oil servo 250 for the front brake band by way of a 1-2 shift valve 43 and an orifice control valve 44. The discharge side of the manual valve 35 is also communicated by way of oil passages 45 and 55 and a 2-3 shift valve 46 with oil servos 160 and 250 each for the rear clutch and the front brake band. This particular discharge side is further communicated by way of an oil passage 47 and the 1-2 shift valve 43 with an oil servo 260 for the rear brake band. The discharge side under consideration is thus formed with four outlet ports leading to the oil passages 40, 45, 55 and 47 which are selected in response to the selection of a shift lever (not shown) disposed in the vehicle driver compartment. The shift lever is mechanically lined with the manual valve 35 for selectively providing one of the operating ranges including P (Parking), R (Reverse), N (Neutral), $D_1$ (Drive), $D_2$ (Drive) and L (Low Speed). The downshift plug 41 and the throttle valve 42 are responsive to the displacement of an accelerator pedal in the driver compartment partly for supplying through an oil passage 49 with a check ball 48 to a throttle modulator valve 50 and to a throttle relay valve 51 a throttle pressure, which is responsive to the engine load, and partly for supplying through the same route to the two valves 50 and 51 a throttle pressure which is substantially equal to such a line pressure as is experienced when the accelerator pedal is fully depressed. The throttle modulator valve 50 produces a throttle modulator pressure which is lower than the throttle pressure by a pressure drop corresponding to its spring tension. This throttle modulator pressure is introduced through an oil passage 52 into the 1-2 shift valve and the 2-3 shift valve. The oil pumped at the rear oil pump 33 is supplied to a governor valve 53 at which a governor pressure is produced corresponding to the vehicle speed. This governor pressure is then introduced through an oil passage 54 into the 1-2 shift valve 43, the orifice control valve 44, the 2-3 shift valve 46 and the throttle relay valve 51. The 1-2 shift valve 43 is, more specifically, operative to effect shifting between the first and second driving speed ratios in dependence upon the relationship between the governor pressure and the opposite throttle modulator pressure. The orifice control valve 44 is operative to timely control the line pressure to the oil servo 250 for the front brake band in dependence upon the governor pressure. The 2-3 shift valve 46 is operative to effect shifting between the second and third driving speed ratios in dependence upon the relationship between the governor pressure and the throttle modulator pressure. The throttle relay valve 51 is operative to provide relationship of the regulated pressure of the pressure regulator valve 34 with the governor pressure and the throttle pressure.

Figure 4:
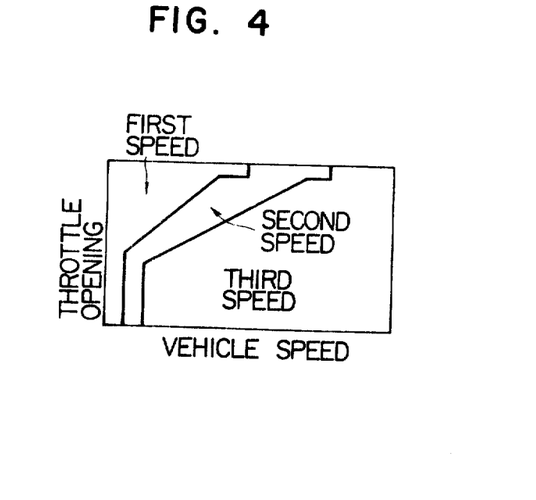
FIG. 4 is a graphical representation of shift patterns of the oil pressure control system of FIG. 3.

When, in operation, the manual valve 35 is shifted to the D range, the line pressure is introduced into the oil passage 40 to actuate the oil servo 140 so that the front clutch 14 is brought into friction engagement. Accordingly, the throttle modulator pressure from the throttle modulator valve 50 downstream of the throttle valve 42 together with the governor pressure from the governor valve 53 are respectively introduced into the two shift valves 43 and 46. At a low speed, neither of the shift valves 43 and 46 conducts change-over operation. Since the oil servo 140 under the line pressure in the line 40 keeps the front clutch 14 in frictional engagement, the transmission mechanism 10 provides a first speed ratio, as has been described above. When the governor pressure has increased with the vehicle speed and exceeded a predetermined value, the 1-2 shift valve 43 conducts its change-over operation, to thereby provide fluid communication of the oil passage 40 with the oil servo 250 which actuates the front brake band 25 so that a second speed ratio is obtained. A further increase of the vehicle speed causes the 2-3 shift valve 46 to conduct its change-over operation, to thereby provide fluid communication of the oil passage 45 with the oil servo 160 which actuates the rear clutch 16 while releasing the accumulated pressure in the oil servo 250. Thus, a third speed ratio is obtained. When, on the other hand, the manual valve 35 is shifted to the L range, the line pressure is also introduced into the oil passage 47 and accordingly into the oil servo 260 to bring the rear brake band 26 into braking action. When, however, the manual valve 35 is shifted to the R range, the line pressure is introduced into the oil passages 47 and 55 to render the oil servos actuated to bring the rear brake band 26 and the rear clutch 16 into action. The resultant shift patterns representing the relationship between the vehicle speed and the throttle opening at the shifting operations are shown in FIG. 4. Although not shown in FIG. 4, the shift patterns for the downshift operations will be moved leftwardly of the figure, or in other words, downshift operations for the same throttle opening will occur at a lower vehicle speed, as is known in the art.

Figures 5, 6:
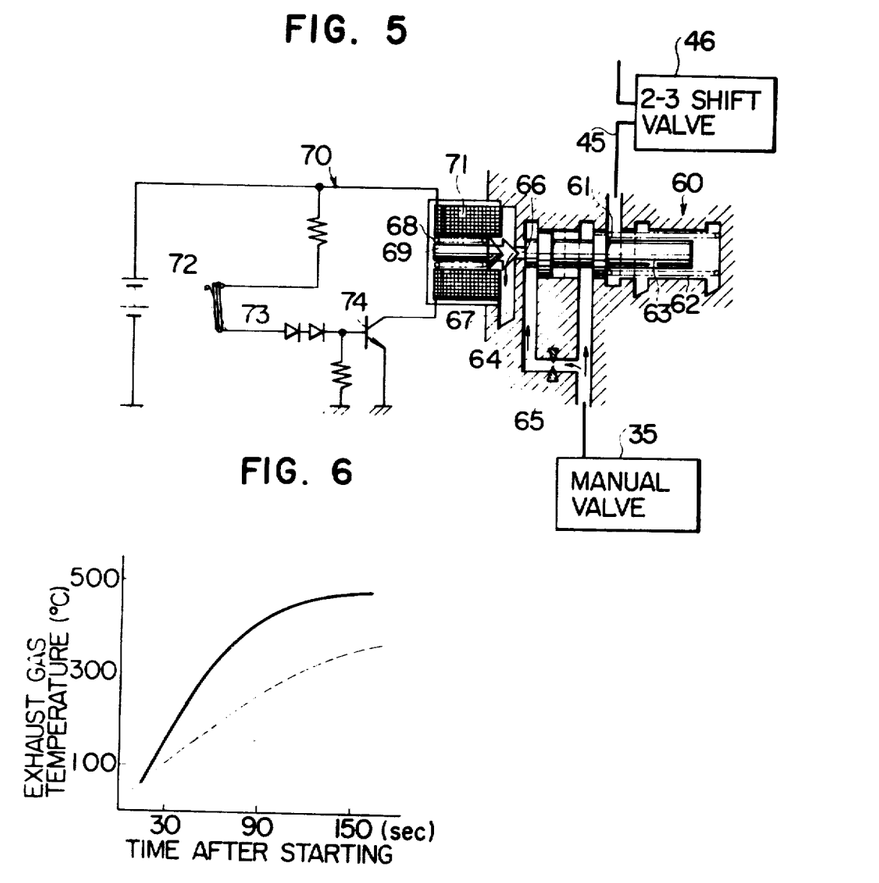
FIG. 5 is a circuit diagram showing a first embodiment of the present invention.
FIG. 6 is a graphical representation showing temperature rise characteristics of the engine exhaust gases which are experienced in an upshift operation from second to third driving speed ratio.

According to the present invention, a shift point control system is mounted in the oil pressure control system 30 for the automatic power transmission mechanism 10, both of which have been described in the above. In FIG. 5 is shown a first embodiment of the shift point control system, in which there are included delay means whereby line pressure supply is blocked thereby to delay the upshift operations. As shown, a relay valve 60 is provided midway of the oil passage 45 leading from the manual valve 35 to the 2-3 shift valve 46. At the actuation side of this relay valve 60 is provided an exhaust gas temperature responsive circuit 70 which produces an electric signal when the temperature of the engine exhaust gases is below a predetermined level. More specifically, the relay valve 60 includes an oil chamber 61 open into the oil passage 45, a spool 63 biased by a spring 62 for controlling opening of the oil chamber 61, an oil passage 64 for introducing the line pressure from the oil passage 45 to move the spool 63 against the action of the spring 62, an orifice 65 formed in the oil passage 64, an oil release passage 67 having fluid communication with the oil passage 64 through an oil release port 66, and a plunger 69 biased by a spring 68 for controlling opening the oil release port 66. The exhaust gas temperature responsive circuit 70 includes a solenoid 71 for moving the plunger 69, a battery 72 for supplying electric current to the solenoid 71, a bimetal switch 73 operating to open and close in response to the temperature of the engine exhaust gases, a switching transistor 74 which when conductive closes the circuit including the solenoid 71 and the battery 72 when the switch 73 is closed. When, therefore, the exhaust gas temperature is at such a low level that activity of the catalyst is not sufficient, then the switch 73 closes to render the transistor 74 conductive. As a result, the solenoid 71 is energized to attract the plunger 69 so as to open the oil release port 66. Thus, the line pressure, which has been introduced into the oil passage 64 through the oil passage 45, is released into the oil release passage 67 to leave the spool 63 moved leftwardly by the action of the spring 62. As a result, the oil passage 45 as well as the oil chamber 61 is closed to block supply of the line pressure to the 2-3 shift valve 46. Therefore, even if the vehicle speed reaches a level at which the 2-3 shift valve should conduct the change-over operation, i.e. upshift to the third speed ratio, the 2-3 shift valve does not conduct such a change-over operation so that the transmission 10 will still remain in the second speed ratio. This results in the engine running at a higher speed than in the case where the upshift to the third speed ratio has been effected. In this way, the engine speed is increased with increase in the vehicle speed to rapidly promote temperature rise of the engine exhaust gases. When, the exhaust gas temperature is increased to a predetermined level at which the catalyst provides sufficient activity, then the switch 73 is opened and solenoid 71 is deenergized to leave the oil release port 66 closed by the plunger 69, so that the spool 63 is moved rightwardly by the action of the line pressure in the oil passage 64 to provide fluid communication between the oil chamber 61 and the oil passage 45. In this way, the normal shifting operations are carried out between the second and third speed ratios.

In FIG. 6 there is shown an example of the resultant temperature rise characteristics which are obtained when the exhaust gas temperature increase is promoted in accordance with the present invention. As seen from FIG. 6, the temperature rise characteristics of a system according to the invention shown in a solid curve are significantly superior to those of a conventional system shown in a dotted curve, in which the promotion of the exhaust temperature increase is not performed when the motor vehicle running according to a selected pattern is upshifted to the third speed ratio. The bimetal switch 73 may be mounted either inside or outside of the engine exhaust pipe 3, as shown in FIG. 1, or, if desired it may be of the type responsive to the temperatures of the engine oil, the cylinder block, the cooling water, the transmission oil and the like which will increase with time lapse after engine starting.

Figure 7:
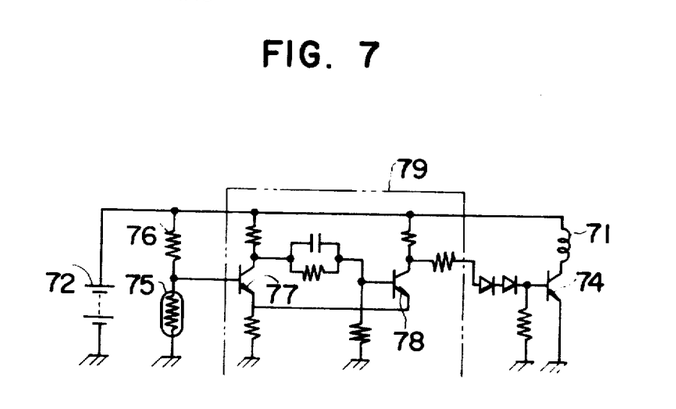
FIG. 7 is a circuit diagram showing another example of a temperature responsive circuit for detecting the temperature of the engine exhaust gases.

Turning now to FIG. 7, another example of the exhaust gas temperature responsive circuit 70 is shown which employs a temperature responsive element such as a thermistor having a resistivity variable in response to the surrounding temperature. As shown, a thermistor 75, which is mounted in a suitable position for detecting the exhaust gas temperature and has its resistivity decreased with increase in the particular temperature, is electrically connected to a positive terminal of a battery 72 by way of a resistor 76. The connecting point therebetween is further connected to the base of a transistor 74 by way of a known Schmitt trigger circuit 79 including two transistors 77 and 78. Thus, the voltage of the battery 72 is divided between the resistor 76 and the thermistor 75, and the divided voltage is impressed to the base of the transistor 77. The transistor 78 is rendered nonconductive with the base potential of the transistor 77 exceeding a higher trigger level $V_1$, while the transistor 78 is rendered conductive with the above base potential being below a lower trigger level $V_2$. When, however, the base potential resides in the range between the two levels $V_1$ and $V_2$, the conductivity of the transistor 78 maintains its former condition. Thus, when the exhaust gas temperature is below a predetermined level, the larger resistivity of the thermistor 75 causes the base potential of the transistor 77 to exceed the trigger level $V_1$ to render the transistor nonconductive. At this instance, the high base potential renders the transistor 74 conductive to energize the solenoid 71. As the exhaust gas temperature is increased, the resistivity of the thermistor 75 will accordingly be decreased to reduce the base potential of the transistor 77 lower than the trigger level $V_2$. Then, the transistor 78 turns conductive to decrease the base potential of the transistor 74. With the resultant nonconductive transistor 74, the solenoid 71 is deenergized. In these ways, therefore, the solenoid 71 is energized only when the exhaust gas temperature is lower than a predetermined level at which the catalyst commences activity. Meanwhile, only the 2–3 shift valve 46 is prevented from conducting its upshift operation to the third speed ratio.

Figure 8:
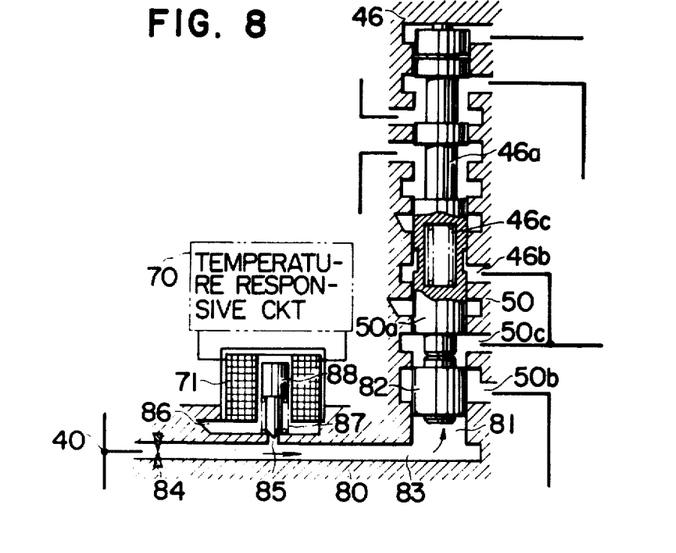
FIG. 8 is similar to FIG. 5 but shows a second embodiment of the present invention.

Turning now to FIG. 8, there is shown a second embodiment of the present invention in which the changeover conditions of the shift valve are altered to convert the shift points to a higher level of vehicle speed. In this embodiment, the throttle modulator valve 50 is provided with a shift operation retaining system 80 and with the exhaust gas temperature responsive circuit 70 as shown in FIG. 5 or 7. More specifically, the 2–3 shift valve 46 includes a spool 46a, an oil chamber 46b into which the throttle modulator pressure is introduced, and a spring 46c applying its spring action, which varies in response to the operation of the throttle modulator valve 50, to the spool 46a. The throttle modulator valve 50 includes a spool 50a, an oil chamber 50b into which the throttle pressure is introduced, and an oil chamber 50c for releasing therefrom the throttle modulator pressure. In this embodiment, the shift operation retaining system 80 is mounted in the vicinity of the 2–3 shift valve 46 and the throttle modulator valve 50, both of which have their spools 46a and 50a aligned with each other. The retaining system 80 is disposed such that the shifting operation of the spool 46a of the 2–3 shift valve 46 is retained from its downward movement from the throttle modulator valve 50. For this purpose, the retaining system 80 includes an oil chamber 81 provided in fluid communication with the lower oil chamber 50b of the throttle modulator valve 50, a plug 82 coaxially contacting the spool 50a and vertically movably inserted within the oil chamber 81, an oil passage 83 having fluid communication with the oil passage 40 occupied with the line pressure and having fluid communication with the oil chamber 81 at least in the D range for applying the line pressure in the plug 82, an oil release orifice 84 formed in the oil passage 83, an oil passage 86 having fluid communication with the oil passage 83 through an oil release port 85, and a plunger 88 biased by a spring 87 and actuated by the solenoid 71 of the exhaust gas temperature responsive circuit 70 for controlling the opening of the oil release port 85. With these arrangements, when the exhaust gas temperature is at a low level and the solenoid 71 is energized, then the oil release port 85 is closed, contrary to the situation described in connection with FIG. 5, so that the line pressure introduced into the oil chamber 81 through the oil passage 83 operates to move upward the spool 50a together with the plug 82. As a result, the spool 46a of the 2–3 shift valve 46 is locked in contact with the spool 50a, or otherwise is retained from downward movement by the spring action of the spring 46c which is responsive to the displacement of the spool 50a. Thus, the shift point between the second and third speed ratios is shifted to occur at a higher level of vehicle speed irrespective of the throttle modulator pressure. When, after a while, the exhaust gas temperature is raised to a predetermined level, the solenoid 71 is released from the conductive condition to open the oil release port 85, thus scavenging the high pressure prevailing in the oil chamber 81. As a result, the plug 82 assumes its lowermost position to return the to valves 46 and 50 to their normal operating conditions.

Figure 9:
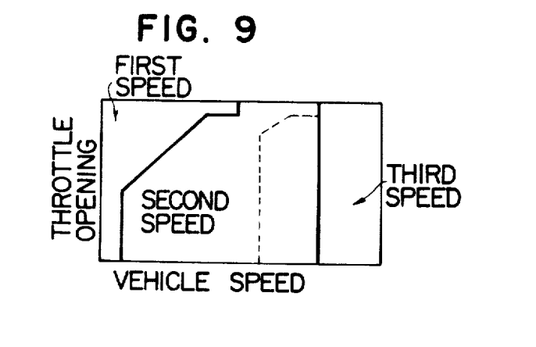
FIG. 9 is similar to FIG. 4 but shows shift patterns obtained from the second embodiment.

In FIG. 9, shift patterns obtained in accordance with the second embodiment of the invention are shown, in which the shift point between the second and third speed ratios are shifted when the exhaust gas temperature remains at a low level. When, in this instance, the land area of the plug 82 is the same as that of the spool 50a of the throttle modulator valve 50, as exemplified in FIG. 8, then the shift point can be determined irrespective of the throttle modulator pressure as shown in a solid curve. This is because the throttle modulator pressure is always below the line pressure. When, on the contrary, the former land area is smaller than the latter land area, the shift point is moved to a relatively low level of the vehicle speed, as shown in a dotted curve, and at the same time is determined by the relationship between the throttle modulator pressure and the governor pressure, for a throttle opening larger than a predetermined level.

Figure 10:
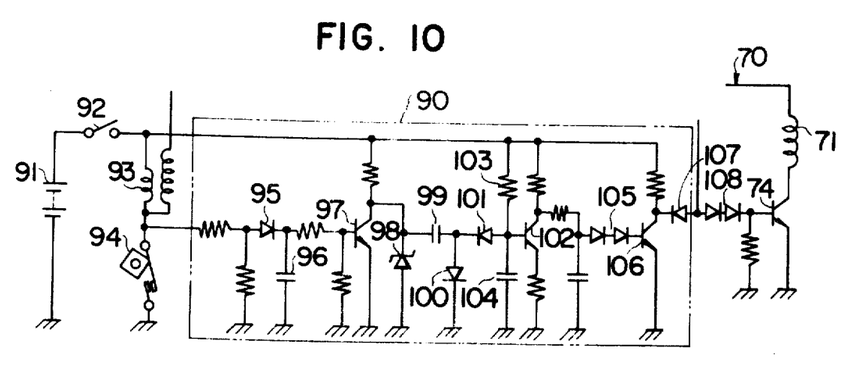
FIG. 10 is a circuit diagram showing an example of a safety device for preventing excessive rotation of the engine.

From the foregoing detailed description of the two embodiments, it will be seen that there may be experienced in the present invention a situation whereby there may occur excessive rotation to the engine. This may be brought about by the fact that as has been previously explained, a principal operating feature of the invention involves promoting temperature rise of the engine exhaust gases while the temperature is at a low level by increasing the engine speed without effecting upshift of the transmission. In order to obviate such a situation whereby excessive engine rotation might occur, a safety device 90 is provided which operates to release the shift point control operation when the engine speed exceeds a predetermined level e.g. 5000 rpm. This will be described in more detail with reference to FIG. 10. As shown, the safety device 90 is connected as a unit to an ignition system which is operative to detect the number of revolutions of the engine. The ignition system is itself constituted as a closed circuit including a battery 91, an ignition switch 92, a primary ignition coil 93 and a contact point 94. The safety device 90 includes a diode 95 for rectifying the electric pulses which are generated in response to the cyclic contacts of the contact point 94, a capacitor 96 for filtering off the high frequency components, an amplifying transistor 97, a Zener diode 98 for limiting the amplitude of the filtered pulses to obtain positive rectangular pulses, a capacitor 99 for differentiation, a diode 100 for eliminating the positive pulses to retain the negative pulses, a diode 101 for rectifying the negative pulses, a transistor 102 for generating at the collector thereof a positive D.C. voltage, which is increased with the increase in the number of the negative pulses indicating the engine speed, a resistor 103 for giving a positive bias to the base potential of the transistor 102, and a capacitor 104 for integration to lower the base potential of the transistor 102 as well as the bias voltage of the resistor 103. These electric elements i.e. the diode 95 to capacitor 104 are electrically connected to the primary ignition coil 93 and to each other in indicated orders, as shown in FIG. 10. To the collector of the transistor 102 which generates a D.C. voltage responsive to the engine speed, is connected an anode of a level shift diode 108 of the exhaust gas temperature responsive circuit 70 through a level shift diode 105, a transistor 106 and diode 107 for controlling conductivity of the transistor 74 with use of the D.C. voltage responsive to the engine speed. With this arrangement, when the transistor 102 produces a high D.C. voltage in response to an increase in the engine speed exceeding a predetermined number of rotations, then the transistor 106 turns conductive to ground the anode of the level shift diode 108 of the responsive circuit 70 to the earth through the transistor 106 itself. As a result, the transistor 74 is rendered nonconductive to release the solenoid 71 from its energized condition, thus terminating the shift point control operation.

As has been described hereinbefore, in the present invention, the catalyst of a catalytic converter used with a motor vehicle having an automatic power transmission mechanism is rapidly heated to a predetermined effective temperature by promoting temperature rise of the engine exhaust gases when the exhaust gas temperature is at a low level, so that the activity of the catalyst is quickly achieved as soon as possible after engine starting. Although the foregoing description of the present invention has been limited to the two preferred embodiments applied in an automatic power transmission mechanism having three forward and one reverse speed ratios in which an upshift from the second to third speed ratios is controlled, the present invention should not be limited to such embodiments but can be applied to an automatic power transmission mechanism with more than three forward speed ratios or to any automatic power transmission mechanism in which an upshift from the first to second speed ratios is controlled.

While specific embodiments of the invention have been shown and described in detail to illustrate the application of the inventive principles, it will be understood that the invention may be embodied otherwise without departing from such principles.

What is claimed is:

1. In a motor vehicle including an engine, an automatic power transmission mechanism for transmitting power from said engine to drive said vehicle, an engine exhaust gas system having a catalytic convertor including a catalyst for purifying exhaust gases from said engine, and an oil pressure system for controlling operation of said automatic transmission mechanism to selectively provide a plurality of forward driving speed ratios, the improvement consisting of a control system for expediting temperature rise of said catalyst, said control system comprising;

shift means operatively associated with said oil pressure system for effecting shift control operation of said transmission mechanism from a lower to a higher driving speed ratio;

sensing means connected for sensing temperature indicative of the temperature of exhaust gases within said catalytic convertor;

delay means responsive to said sensing means and connected to control said shift means in accordance with the temperature of said exhaust gases in said catalytic converter to prevent operation thereof to shift said transmission from said lower to said higher driving speed ratio when the temperature sensed by said sensing means indicates a catalyst temperature below a predetermined level;

whereby upshift of said transmission to said higher driving speed ratio is delayed until said predetermined temperature level is reached.

2. A system according to claim 1 wherein said oil pressure system includes supply means for providing to said system oil under pressure, said oil pressure system further including an oil supply circuit for supplying said oil to said shift means, said shift means including a valve mechanism operable to effect said shift control operation of said transmission in accordance with the supply of oil thereto, and wherein said delay means comprise a valve mechanism located in said oil supply circuit and operable in response to said sensing means to open and close said oil supply circuit thereby to control supply of oil to said shift means.

3. A system according to claim 2 wherein said shift means operates to effect shifting of said transmission from said lower to said higher driving speed ratio when oil is supplied thereto through said oil supply circuit, and wherein said delay means operate to maintain said oil supply circuit closed thereby preventing oil supply to said shift means when the temperature sensed by said sensing means is below said predetermined level.

4. A system according to claim 3 wherein said delay means valve mechanism comprises spring means biasing said valve mechanism to close said oil supply circuit, conduit means supplying pressurized oil to said valve mechanism to overcome the biasing action of said spring means thereby to open said oil supply circuit, and means responsive to said sensing means for venting said conduit means to release said oil supplied to said valve mechanism when the temperature sensed by said sensing means is below said predetermined level thereby to permit said spring means to effect closure of said oil supply circuit.

5. A system according to claim 4 wherein said venting means comprise a solenoid having a movable armature, and port means located to be opened and closed by said armature, said port means being located in said conduit means to effect said venting of said conduit means when in the opened condition, and wherein said sensing means comprise thermally responsive electrical means controlling operation of said solenoid in accordance with the temperature of said catalyst to drive said armature to open said port means when the temperature of said catalyst is below said predetermined level.

6. A system according to claim 1 wherein said oil pressure system includes means for supplying oil under pressure to said shift means in dependence upon the speed of said vehicle, with said shift means including a first valve spool movable to effect said shift control operation of said transmission in accordance with the supply of oil thereto, and wherein said delay means include a second valve spool located adjacent said first valve spool and movable in accordance with supply of oil thereto to a position restraining movement of said first valve spool, said system further including means responsive to said sensing means for controlling oil supply to said second valve spool in accordance with the temperature sensed by said sensing means, said sensing means being operative to effect supply of oil to said second valve spool when said sensed temperature is below said predetermined level thereby moving said second valve spool to a position restricting movement of said first valve spool whereby said first valve spool is thereby biased to effect said shift control operation at a higher level vehicle speed.

7. A system according to claim 6 wherein said means controlling oil supply to said second valve spool comprise a solenoid including a movable armature, port means located to be opened and closed by said armature and operative to vent oil supply to said second valve spool when in the opened condition, and wherein said sensing means include thermally responsive electrical means operative to control said solenoid to effect closing of said port means when the temperature sensed by said sensing means is below said predetermined level thereby to effect oil supply to said second valve spool positioning said second valve spool to restrict movement of said first valve spool.

* * * * *